US008265171B2

(12) United States Patent
Steinbach et al.

(10) Patent No.: US 8,265,171 B2
(45) Date of Patent: Sep. 11, 2012

(54) ERROR RESILIENT VIDEO TRANSMISSION USING INSTANTANEOUS RECEIVER FEEDBACK AND CHANNEL QUALITY ADAPTIVE PACKET RETRANSMISSION

(75) Inventors: Eckehard Goetz Steinbach, Olching (DE); Wei-Kung Deng, Taipei (TW); Shyh-Chyi Wong, Taipei (TW)

(73) Assignee: Richwave Technology Corp., Taipei (TW)

( * ) Notice: Subject to any disclaimer, the term of this patent is extended or adjusted under 35 U.S.C. 154(b) by 1171 days.

(21) Appl. No.: 12/110,570

(22) Filed: Apr. 28, 2008

(65) Prior Publication Data

US 2009/0213940 A1 Aug. 27, 2009

Related U.S. Application Data

(60) Provisional application No. 61/031,490, filed on Feb. 26, 2008.

(51) Int. Cl.
*H04N 7/12* (2006.01)
*H04N 11/02* (2006.01)
*H04N 11/04* (2006.01)

(52) U.S. Cl. ............. 375/240.27; 714/48; 714/746; 714/748; 714/749; 714/751; 714/752

(58) Field of Classification Search ........... 375/240.01–240.29; 709/220; 714/48–57, 246, 748–752; 370/466; 348/425.2
See application file for complete search history.

(56) References Cited

U.S. PATENT DOCUMENTS

| 5,768,527 | A | 6/1998 | Zhu et al. |
| 2001/0019589 | A1* | 9/2001 | Kim et al. ............... 375/240.27 |
| 2003/0014705 | A1* | 1/2003 | Suzuki et al. .................. 714/748 |
| 2003/0126238 | A1* | 7/2003 | Kohno et al. .................. 709/220 |
| 2005/0123045 | A1* | 6/2005 | Hannuksela ............ 375/240.12 |
| 2006/0206775 | A1* | 9/2006 | Bhaskaran ..................... 714/752 |
| 2007/0153898 | A1* | 7/2007 | Yim ......................... 375/240.16 |
| 2007/0291788 | A1* | 12/2007 | Sammour et al. ............. 370/466 |

* cited by examiner

*Primary Examiner* — Sath V Perungavoor
*Assistant Examiner* — Nathnael Aynalem
(74) *Attorney, Agent, or Firm* — Edell, Shapiro & Finnan, LLC

(57) ABSTRACT

Systems and methods for delivering real-time video imagery to a receiver over a channel. A current video frame is captured and digitized. The digitized frame is divided into a plurality of macroblocks. For each macroblock an intra, inter or skip mode coding mode is determined. Based on instantaneous feedback received from a receiver regarding successfully received video packets for a prior video frame, a quantization parameter is set and the macroblocks are encoded in accordance with their respective selected coding mode. Synchronized error concealment is performed at both the encoder and decoder sides of the system and retransmission of lost video packets, using an adaptive retransmission scheme, are performed in accordance with the instantaneous feedback from the receiver.

27 Claims, 13 Drawing Sheets

ERROR RESILIENT VIDEO TRANSMISSION USING INSTANTANEOUS RECEIVER FEEDBACK AND CHANNEL QUALITY ADAPTIVE PACKET RETRANSMISSION

This application claims the benefit of U.S. provisional application No. 61/031,490, filed Feb. 26, 2008, which is incorporated by reference herein in its entirety.

FIELD OF THE INVENTION

Embodiments of the present invention relate to digital video transmission. More specifically, embodiments of the invention relate to error-resilient real-time digital video transmission systems and methodologies.

BACKGROUND OF THE INVENTION

There is an ever-increasing demand for wireless services. From simple one-way pagers to full function cellular telephony, consumers and users continue to insist on the fastest and most functionally comprehensive technologies. In this regard, users are now increasingly demanding wireless real-time audio/video content delivery to mobile telephones, PDAs, laptop computers, or any other portable device having the ability to receive and play such content. News, sports and entertainment programming is becoming more readily available for distribution for such platforms and consumers are increasingly eager to receive it.

However, delivering such content in an efficient and user-acceptable manner is no small task. As discussed in, for example, U.S. Pat. No. 5,768,527 to Zhu et al., which is directed to a wired infrastructure, one of the biggest issues to overcome in real-time audio/video transmission is packet loss. Packets may be lost during transmission for any number of reasons, including bit errors due to physical links in a network, as well as limited buffering and processing capabilities at network nodes. In a wireless environment, in particular (which Zhu et al. do not address), carrier signals may be lost as a result of physical structures (e.g., mountains, buildings, etc.) that are disposed between a transmitting location and a receiving location, as well as a result of environmental factors such as weather. Of course, if a carrier signal is lost, then any packets that were being transmitted during that no-carrier signal period will also be lost.

Thus, there is a continuing demand for systems and methodologies that improve the delivery of content, especially real-time audio and video content, to wireless devices.

SUMMARY OF THE INVENTION

Embodiments of the present invention provide systems and methodologies for error-resilient real-time digital video transmission. A block-based hybrid video codec (e.g., MPEG-X, H.26X) is used to compress a captured video sequence, video frames are encoded into fixed size or variable size video packets (slices), and these packets are then transmitted to a receiver for decoding and presentation. Based on instantaneous feedback from the receiver about successfully transmitted or lost packets, synchronized error concealment is performed at both the encoder and the decoder. Coding control performs mode decisions at the encoder based on the concealed reference frame, and macroblock-level rate control is used to encode one frame according to a given bit budget assigned to that frame. The error resilience scheme may be combined with a methodology for retransmission of lost packets that, in at least one instance, splits time intervals into a bit budget for source encoding and a bit budget for lost packet retransmission.

Although described primarily in a wireless context, embodiments of the present invention are equally applicable to a wired transmission and feedback implementation.

These and other features of embodiments of the present invention will be more fully appreciated upon a reading of the following detailed description in conjunction with the several associated drawings, which are listed immediately below.

DETAILED DESCRIPTION

Reference will now be made in detail to embodiments consistent with the present invention, examples of which are illustrated in the accompanying drawings. Wherever possible, the same reference numbers will be used throughout the drawings to refer to the same or like parts.

1. System Overview

Figure 1:
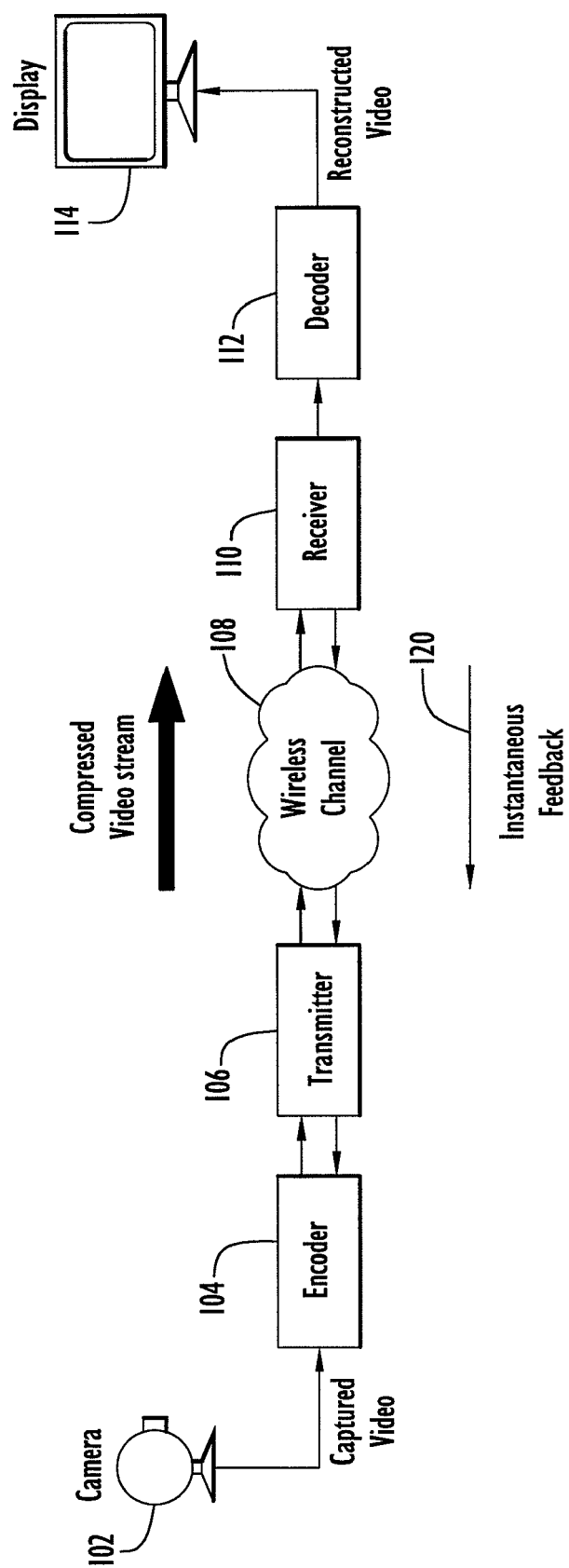
FIG. 1 is a high level depiction of components of an end-to-end system that incorporates features of the present invention.

An overall video transmission system in accordance with an embodiment of the present invention is illustrated in FIG. 1. The video camera 102 captures video frames at a certain frame rate (e.g., 25 frames/second) and the captured video frames are then encoded by the video encoder 104. The video encoder 104 preferably is a block-based hybrid video coding structure (e.g., MPEG-X, H.26X) using motion compensated prediction (MCP) and transform coding (e.g., discrete cosine transform, DCT). Encoded (and compressed) video is then sent over a wireless channel 108 using transmitter 106. At the receiver side, once the receiver 110 receives a video packet, it produces an acknowledgement (instantaneous feedback, 120) and sends it immediately over a wireless feedback channel to the transmitter 106, informing the transmitter 106/encoder 104 if the transmitted video packet was successfully received or damaged in the wireless channel 108. In the meantime, the video packet is decoded by decoder 112 and reconstructed video is presented on display 114. Although shown separately, encoder 104 and transmitter 106 may be integrally formed and function as a single component. Likewise, receiver 110 and decoder 112 may also be integrally formed and function as a single component.

Based on this instantaneous feedback information from the receiver 110, the transmitter 106/encoder 104 determines how best to handle any lost packet(s) and how to encode the next captured video frame (details of which are provided below). In order to avoid mismatch in motion compensation prediction (MCP), lost slices are concealed in exactly the same way at both the encoder 104 and the decoder 112 and the concealed version of the video frame is used for MCP. As will be appreciated by those skilled in the art, the system and methodology of the present invention strongly relies on the instantaneous feedback information from the receiver 110 to the encoder 104 to keep the encoder 104 and decoder 112 synchronized.

As noted, the error-resilient real-time digital video transmission system is based on feedback from the receiver 110 regarding successfully transmitted or lost packets, along with synchronized error concealment that is performed at both the encoder 104 and the decoder 112. In a preferred implementation, the wireless channel may be a wireless point-to-point or wireless client-server arrangement. Standard wireless transmission schemes including Wireless Fidelity (WiFi), BlueTooth (BT), or Ultra Wide Band (UWB) can be employed in connection with the wireless channel. In addition, proprietary wireless schemes or wired infrastructures may be employed. The only requirement is that the receiver can receive the individually transmitted packets and return, virtually instantaneously, acknowledgements (ACKs) or negative acknowledgements (NACKs) with respect to received packets.

In accordance with embodiments of the present invention, each video frame is divided into macroblocks (MBs) and how a macroblock is encoded (INTRA-, INTER- or SKIP-mode) is decided by coding control. Several macroblocks form a slice, which has a fixed or variable size and can be decoded independently from other slices in the same video frame, so that any erroneous bits in the compressed video stream will not have a disastrous effect on the reconstructed video quality. The transmitter 106 puts the compressed video stream into fixed size or variable size video packets (e.g., one slice is put into one packet) and sends them over the wireless channel 108 to the receiver 110. The receiver 110 may be any device (computer, telephone, PDA, and the like) that can receive the compressed video stream. A (wireless) modem in the device is configured to return the instantaneous feedback 120, upon which embodiments of the present invention rely.

While a goal of the instant invention is to display the decoded data in real-time, those skilled in the art will also appreciate that the decoded data may be stored in a buffer (or other volatile memory) for a relatively short period of time for subsequent display, or the decoded data may be stored for a more lengthy period of time in non-volatile memory such as on a hard drive, in NVRAM, or in or on other well-known memory devices, for display or replay at a still future time.

Figure 2:
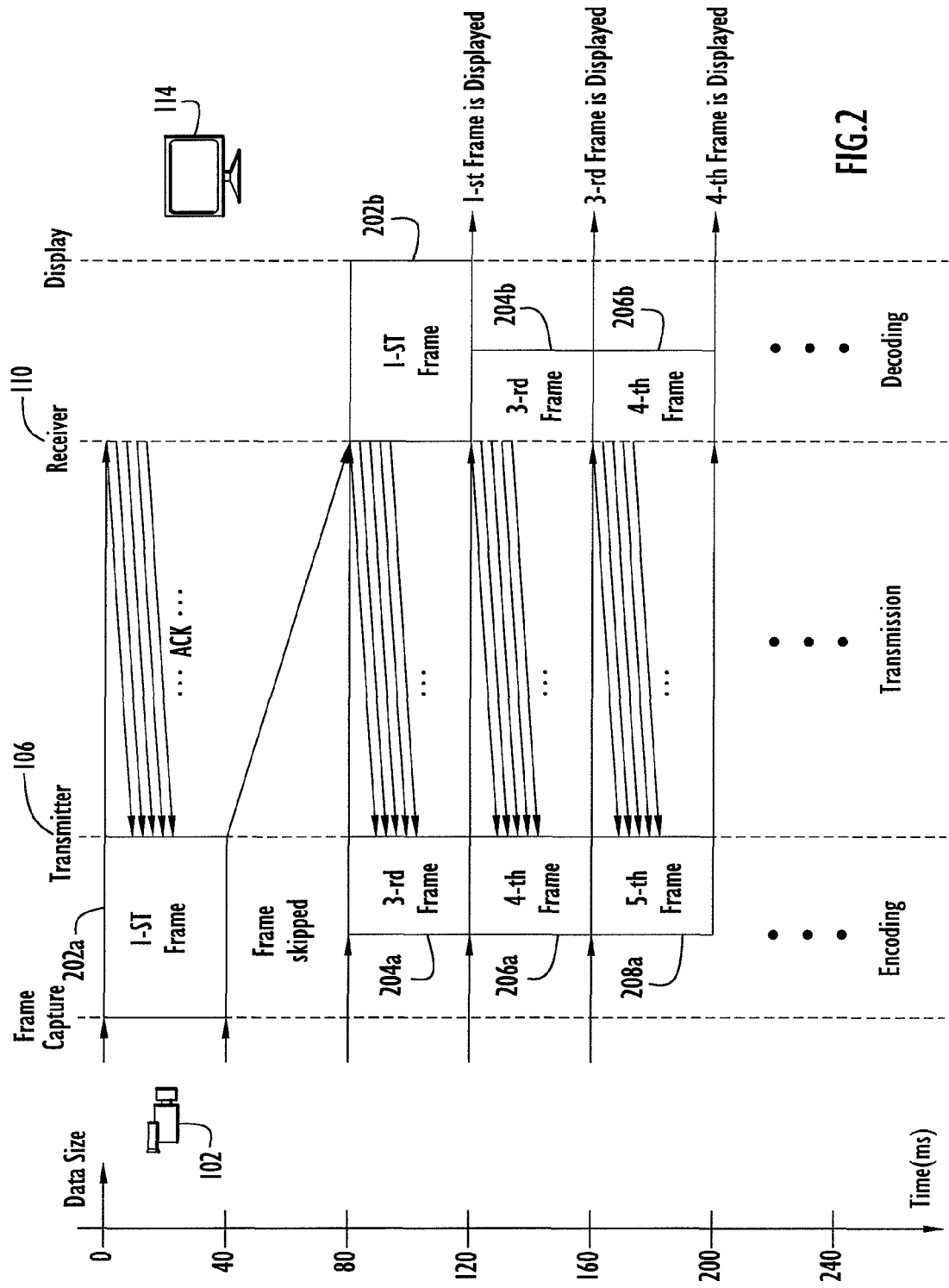
FIG. 2 shows a timing scheme for encoding, transmission, and decoding of video frames in accordance with an embodiment of the present invention.

A more detailed depiction of a timing sequence of the video transmission system is given in FIG. 2. In accordance with an embodiment of the invention, the first captured frame 202a is encoded independently as an I-frame and the other frames are encoded depending on the previous frame as P-frames. A compressed video frame is put into several fixed size or variable size video packets and the packets are sent over the wireless channel 108 to the receiver 110. Since the compression efficiency of encoding an I-frame is significantly lower than encoding a P-frame, doubled bit budget is used for encoding an I-frame to keep the quality consistent, which means two time intervals on the channel are required for transmitting an I-frame. In order to meet the real-time constraint, the captured video frame after an I-frame (e.g., the second captured frame) is skipped and the bit budget (time interval) for this frame is used for the I-frame. Then, the next captured frame is encoded using the I-frame as the reference frame and sent out immediately after the I-frame, e.g., b $3^{rd}$ frame 204a. After that, frames are transmitted in the proper order, 206a, 208a, etc. These frames are decoded on the receiver side as, correspondingly, 202b, 204b (for the $3^{rd}$ frame), 206b, etc.

Figure 3:
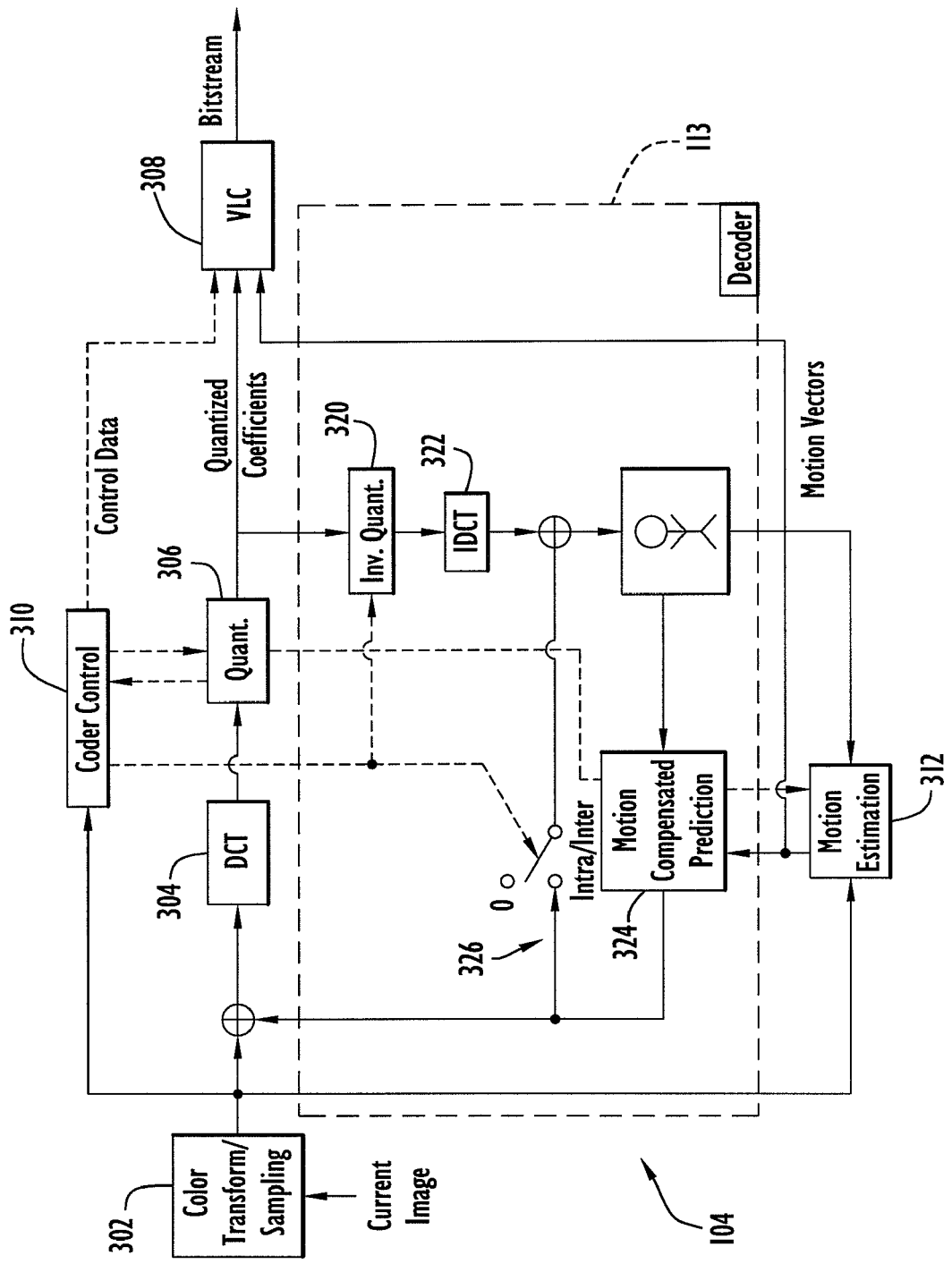
FIG. 3 shows a block-based hybrid video encoder with embedded decoder in accordance with an embodiment of the present invention.

2. Error Resilience and Error Recovery 2.1 Block-Based Hybrid Video Codec with Slice Structure The video codec that is preferably used in conjunction with embodiments of the present invention is based on the well-known block-based hybrid video coding structure (MPEG-X, H.26X), which uses motion compensated prediction (MCP) and discrete cosine transform (DCT) coding. The basic functional building blocks for this coding scheme are shown in FIG. 3.

As shown, the encoder 104, with embedded decoder 113 (which has functionality similar to that of decoder 112), includes a color transform/sampling module 302, a DCT module 304, that is connected to quantizer module 306, which generates quantized coefficients that are passed to variable length coding (VLC) module 308. As shown further, coder control 310 is in communication with quantizer 306. The embedded decoder 113 includes an inverse quantizer 320, an inverse DCT 322, and a motion compensated prediction module 324. An INTRA/INTER coding switch 326, controlled by coder control 310, is used to select independent video frame encoding (INTRA) or encoding using motion compensated prediction (INTER). Motion estimation module 312 provides input to the motion compensated prediction module 324 and is also in communication with coder control 310.

In accordance with the present invention, each captured video frame from the video camera 102 is divided into macroblocks (MBs) of a fixed size, e.g. 16 times 16 pixels, and each macroblock is either encoded independently (INTRA-mode), or predicted from a previously-coded reference frame using motion estimation (INTER-mode), or skipped (SKIP-mode). As noted, the first captured video frame 202a is encoded using the INTRA-mode (I-frame), and the macroblocks in the following frames (P-frames) are encoded in either INTRA-, INTER-, or SKIP-mode, depending on which encoding mode is more efficient (or most appropriate in view of the prevailing circumstances). This mode decision is made by the coder control 310, and is discussed more fully later herein.

A number of macroblocks form a slice and several slices form a video frame. In accordance with embodiments of the present invention, each slice in a video frame is able to be decoded independently from other slices in the same video frame. Preferably, each slice has the same size and one slice is encapsulated into one video packet. One reason why a slice structure is used for error resilient video coding is to stop dependencies between different parts of a video frame such that losing one part (one slice) of the frame does not affect other parts (other slices) of the same frame. If this slice structure is not employed and, instead, one video frame is placed into one video packet, then even only one single bit error in the channel 108 might affect the whole video frame. Therefore, the smaller a slice is, the more resilient the whole system is against transmission errors. However, encoding a video frame into slices will cause more overhead and limits the use of dependencies among slices and therefore reduces the compression efficiency. Moreover, the smaller a slice is, the less efficient the compression will be. Accordingly, the size of the slice is preferably adapted to the channel characteristics to achieve the best overall performance. For instance, the optimum size of a slice may be a function of the channel quality and may be adapted as a function of the observed packet error rate. For simplicity, however, a fixed packet or slice size may be employed.

2.2 Mode Decision Based on Concealed Reference Frame

The macroblocks in the P-frames can be encoded either in INTRA-, INTER-, or SKIP-mode, depending on which mode is more efficient. A heuristic mode decision process is performed by the coder control 310 that operates as follows. To decide which mode to use to encode a given macroblock, the coder control 310 first checks the sum of absolute differences (SAD) between the macroblock to be encoded and the macroblock at the same position in the previous frame. If the difference is below a certain threshold, the macroblock will be skipped and the decoder simply copies the macroblock from the previous frame. Otherwise, motion estimation is performed and the difference (SAD) between the macroblock to be encoded and the best match found in the previous frame is calculated. If this difference (plus a certain offset) is smaller than the deviation-of-mean of the macroblock, the macroblock is encoded in INTER-mode. Otherwise, the macroblock is encoded in INTRA-mode. The mode decision is signaled explicitly in the bitstream transmitted from the encoder 104/transmitter 106.

Figure 4:
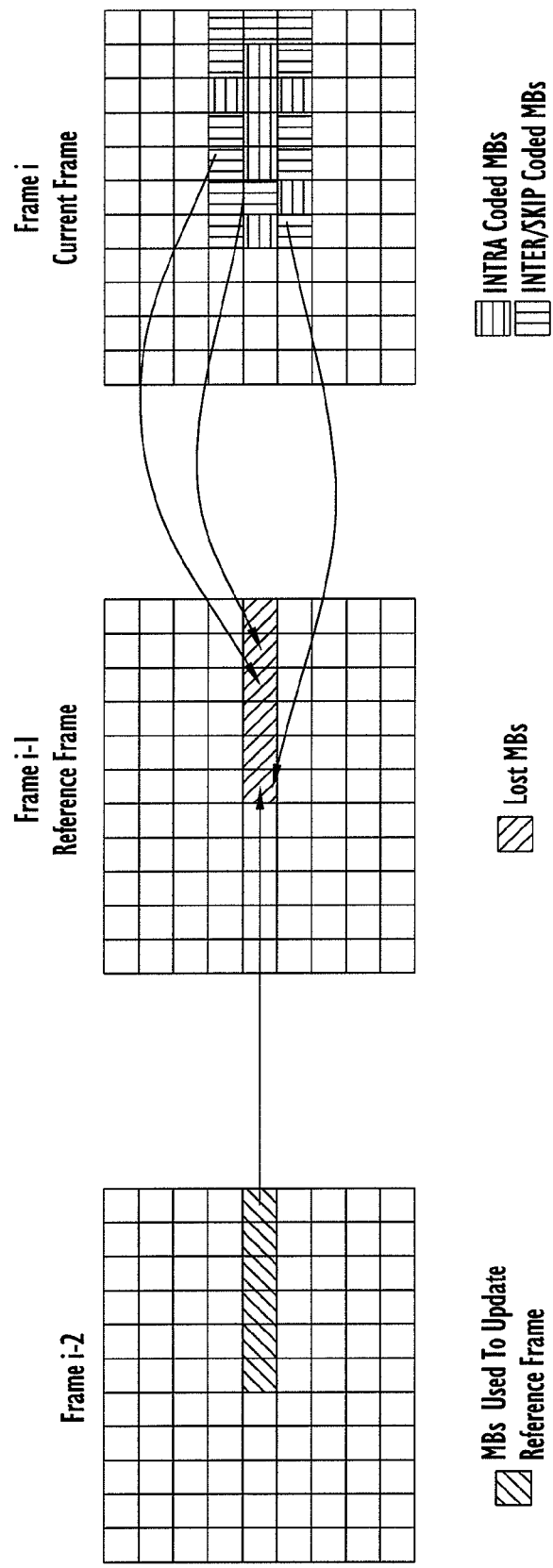
FIG. 4 depicts encoder side error concealment in accordance with an embodiment of the present invention.

As only the concealed version of the reference frame is available at the decoder 112 side, the motion estimation for mode decision is performed at the encoder 104 based on the concealed reference frame to avoid mismatch in the motion compensation prediction process. As shown in FIG. 4, when a video packet in frame i−1 (the reference frame) is lost, the lost slice can be concealed by "borrowing" from frame i−2. The frame i is then encoded using normal motion compensated prediction (MCP) based on the concealed version of frame i−1. If the error concealment is successful, most of the macroblocks in frame i can find a suitable reference in frame i−1. If the concealment is not satisfactory, motion compensated prediction will not perform well and most of the macroblocks in the affected area will be encoded in INTRA-mode.

2.3 Macroblock-Level Rate Control

Practical communication channels have a limit on the number of bits that can be transmitted per second and this bit rate limit is typically fixed in a system in accordance with the present invention. However, a basic block-based hybrid encoder generates a variable number of bits for each encoded frame. That is, motion compensated prediction works better for some frames thereby generating a smaller number of bits as compared to other frames. Therefore, rate control is preferably performed in the encoder 104 to generate an encoded stream with a constant bit rate (slightly) below the channel limit. If this does not occur, some encoded bits of a video frame will not be transmitted and the reconstructed quality may be significantly decreased.

The accuracy of the rate control can have a significant impact on system performance. The more accurate the rate control is, the more efficiently the available channel bit rate will be used, and therefore the better the reconstructed video quality will be. Therefore, macroblock-level rate control is preferably used in the system in order to achieve a high accuracy.

The macroblock-level rate control works as follows. The encoder 104 monitors the number of bits used for the current frame while encoding macroblock by macroblock. If the number of bits is too high, the encoder increases the quantization parameter, which leads to a coarser quantization for the next macroblock and the overall bit rate of the current frame will decrease. If the number of bits is too low, the encoder decreases the quantization parameter, leading to a finer quantization for the next macroblock and an increased overall bit rate for the current frame.

In an actual implementation, rate control will likely never exactly match the target bit budget. Hence, the target bit rate should preferably be selected slightly lower than the available bit rate provided by the digital transmission system.

3. Channel Adaptive Retransmission

As already mentioned, it is not uncommon for video packets to be corrupted or lost during transmission over the wireless channel 108 to the receiver 110. In accordance with a feature of the present invention, the receiver 110 sends immediate feedback information 120 for each video packet over the feedback channel to the transmitter 106, informing the transmitter 106 if a given packet is successfully received or corrupted. For example, a positive ACK can be returned indicating successful receipt/decoding, a negative ACK can be returned indicating unsuccessful receipt/decoding, or if no ACK is returned at all, then the encoder deems that the packet was never received and treats that packet like a negatively ACK'ed packet. Thus, based on the feedback information 120 from the receiver 110, the transmitter 106 knows the status of each video packet and retransmission of the lost packet(s) is considered.

Specifically, a channel adaptive retransmission scheme is employed to decide if the transmitter 106 should retransmit the lost packets, and how the total transmission bit budget is split into bit budget for source coding and bit budget for retransmission of the lost packets.

The retransmission scheme works as follows. All the packets of a video frame are transmitted only once in the first round of transmission. If the total available transmission bit rate is higher than the source coding bit rate, transmitter 106 can retransmit the packets that are lost in the first round. If not all the packets are received successfully after the second round and there is still bit budget available in the timeslot/frame for retransmission, the packets that are still lost will be transmitted again in the third round. This retransmission process ends when the available transmission bit rate for a given frame is used up or all the packets are successfully received by the receiver 110.

Figure 5:
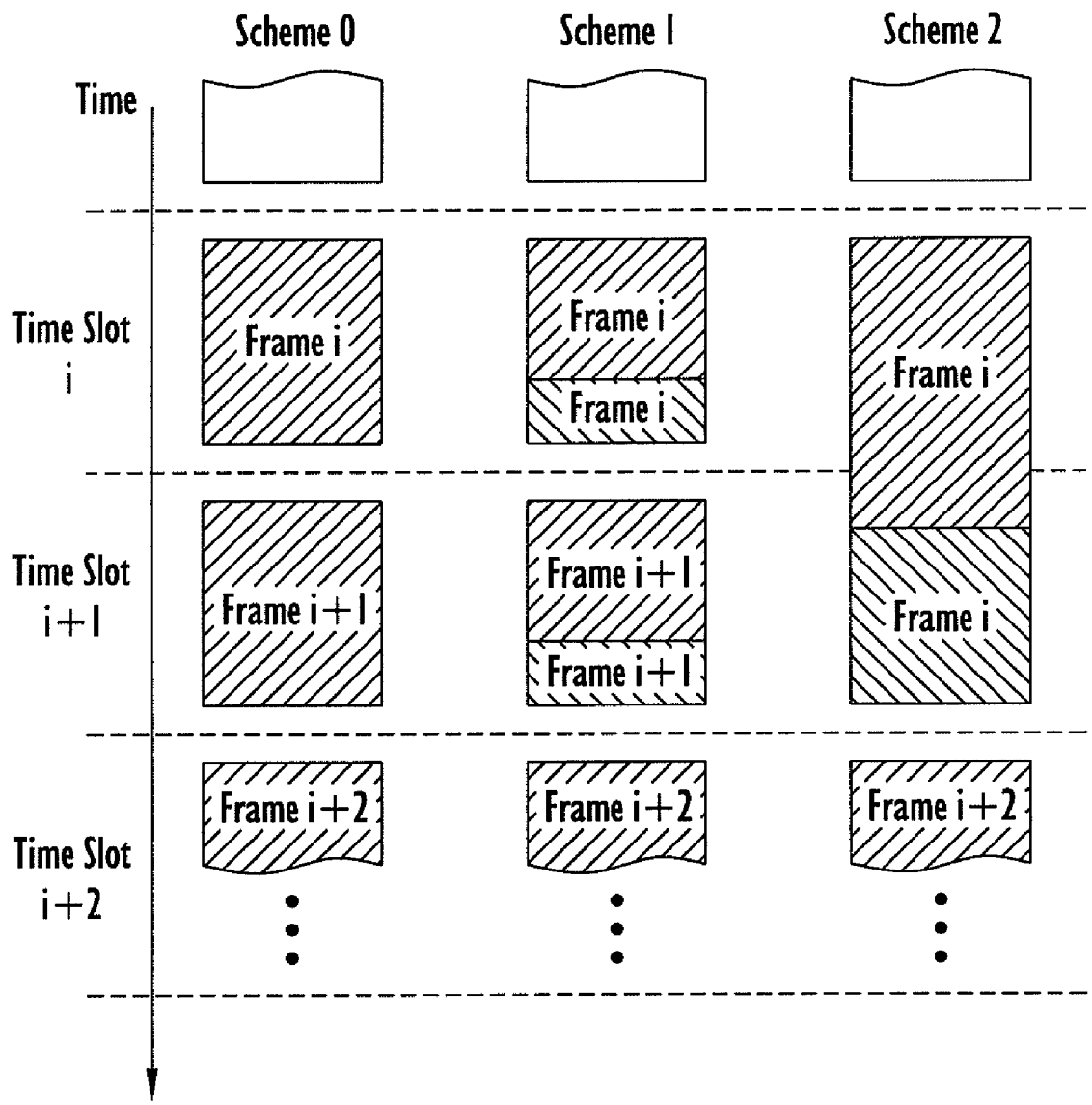
FIG. 5 shows several retransmission schemes that may be employed in connection with embodiments of the present invention.
Figure 6:
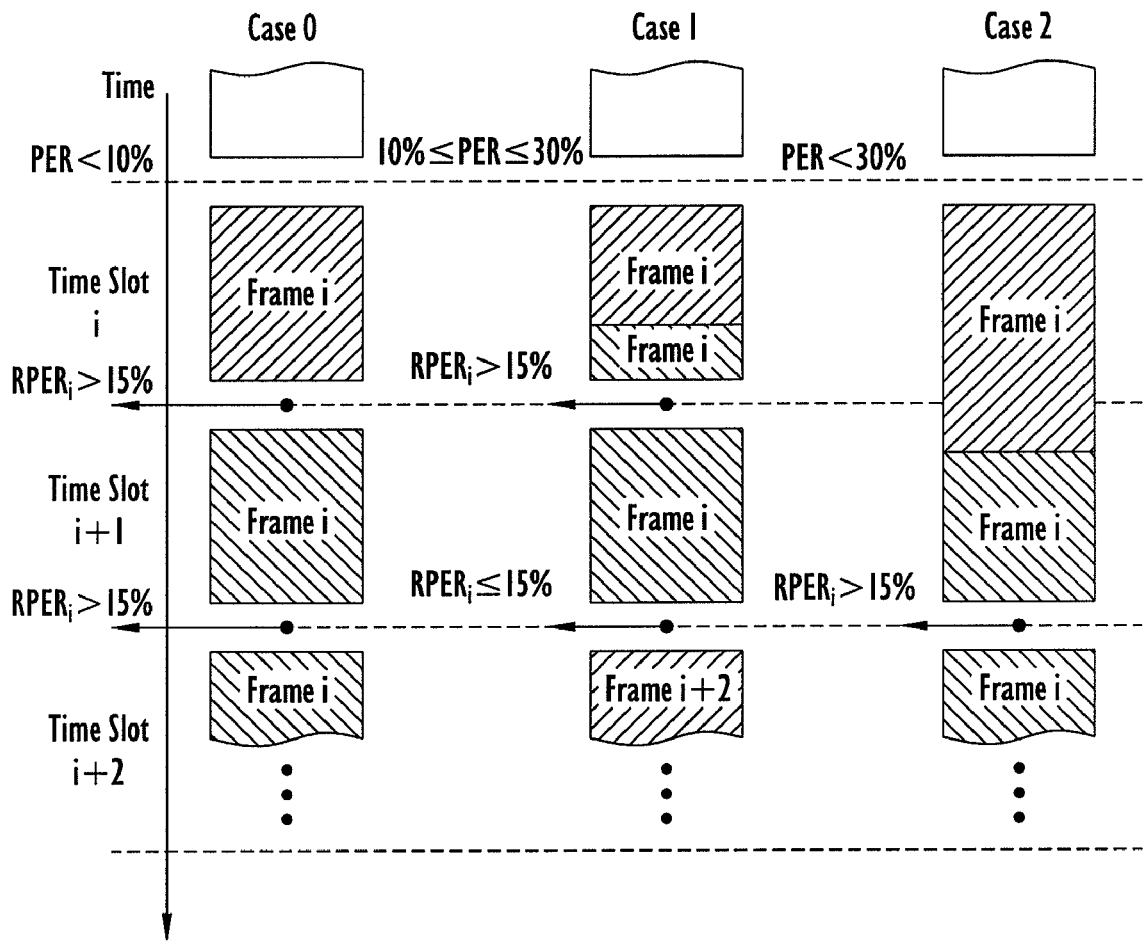
FIG. 6 shows still another retransmission scheme that may be employed in connection with embodiments of the present invention.

In accordance with an embodiment of the present invention, the channel adaptive retransmission process comprises four different retransmission schemes, which are described in detail in Section 3.1 to Section 3.4 below and with reference to FIGS. 5 and 6. Further, a state diagram, shown in FIG. 7, describes how the retransmission schemes are combined to form the channel adaptive retransmission. This aspect of the present invention is described in Section 3.5.

3.1 Retransmission Scheme 0

Before encoding a new video frame, the system, methodology or process first checks the packet error rate (PER) in the wireless channel 108 during the transmission of the previous frame and uses the PER as the estimate of the channel condition during the transmission of the new frame. If the PER of the previous frame is below a certain threshold (e.g. 10%) (established by the feedback received from the receiver 110), the system considers that the wireless channel 108 will be in "good" condition during the transmission of the current frame and therefore no retransmission of lost video packets of the current frame is considered, as the synchronized error concealment (described later herein) at both the encoder and decoder provides satisfactory reconstructed picture quality. The total available transmission bit rate is, consequently, used for source coding and each video packet will be transmitted only once, as shown in FIG. 5, scheme 0.

3.2 Retransmission Scheme 1

In retransmission scheme 1 the system also uses the PER of the previous frame as the estimate of the channel condition for the current frame. If the packet error rate of the previous frame is, for instance, between 10% and 30%, the system considers that the wireless channel will be in "medium" condition for the current frame. In this case, only using synchronized error concealment will likely not provide satisfactory reconstructed picture quality and, therefore, the retransmission of lost packets of the current frame is considered. To save some bit rate for the retransmission, the source coding bit rate is reduced by using coarser quantization for encoding the current frame. Thus, as shown in FIG. 5, scheme 1, in, e.g., Time Slot i, portions of Frame i are retransmitted during the same Time Slot i. The retransmission of the lost video packets will reduce the residual packet error rate (RPER) (i.e., the PER subsequent to retransmission) of the current frame and will significantly increase the reconstructed picture quality. However, in the error-free case, those skilled in the art will appreciate that this will result in a decreased reconstructed picture quality compared to scheme 0, where the total available transmission bit rate is used for source coding.

The bit budget reserved for source coding is computed depending on the packet error rate of the previous frame as follows:

$$R_S^i = \frac{R_C^i}{1 + PER_{i-1} + (PER_{i-1})^2 + \ldots + (PER_{i-1})^n}, \quad (1)$$

where $R_S^i$ denotes the bit budget for encoding frame i, $R_C^i$ denotes the total available bit rate for transmitting frame i, $PER_{i-1}$ denotes the packet error rate in the wireless channel during the transmission of frame i−1 and n is the expected integer number of retransmission rounds for frame i so that the residual packet error rate does not exceed a certain threshold (e.g. 5%), which is computed by solving:

$$(PER_{i-1})^n = 0.05 \text{ (threshold)}. \quad (2)$$

As an example, assume that the expected packet error rate during time slot i is 10% (PER=0.1). Further assume that the rate budget for time slot i $R_C^i$ is 100 kbit. If we plan for only one retransmission (n=1) this means that 10% of the packets transmitted in the first round will have to be retransmitted. We can write this as $R_S^i + PER*R_S^i = R_C^i$. The rate available for source coding becomes $R_S^i = 90.91$ kbit and the rate reserved for retransmissions becomes $(R_C^i - R_S^i) = 9.09$ kbit. The expected residual packet loss rate becomes PER^2=1%. If we plan for two retransmissions we have to solve $R_S^i + PER*R_S^i + PER^2*R_S^i = R_C^i$. The source rate $R_S^i$ becomes $R_S^i = 90.09$ kbit. The expected residual error rate now becomes PER^3=0.1% and so on and so forth.

3.3 Retransmission Scheme 2

If the wireless channel is in "bad" condition and the packet error rate of the previous frame is high (e.g., >30%), the bit budget reserved for source coding using scheme 1 will be too low to get a satisfactory reconstructed picture quality. Therefore, in retransmission scheme 2 (FIG. 5, scheme 2), the frame after the current frame is skipped and the total available bit rate for transmitting the current frame is doubled. The doubled total available bit rate is then split into bit budget for source coding and retransmission budget. The bit budget reserved for source coding is computed using (1) and (2), where $R_C^i$ is the doubled total available transmission bit rate. The resulting source coding budget should be larger than a certain minimum value to keep the distortion introduced by encoding limited to an acceptable extent. Depending on the actual packet error rate, the reconstructed quality of frame i in an error free channel condition could increase, decrease or remain unchanged compared to scheme 0. Since some frames are skipped in this scheme, the effective frame rate is reduced.

To summarize, in scheme 0, no retransmission of the lost packets is considered and the total available bit rate is used for source coding. In scheme 1, the total available bit rate is split into bit budget for source coding and retransmission budget (by employing coarser quantization). In scheme 2, the next frame (here frame i+1) is skipped and the total available bit rate is doubled. The doubled bit rate is then split into source coding budget and retransmission budget.

3.4 Retransmission Scheme 3

If the residual packet error rate (RPER) of the current frame is still too high after the total bit budget is used up, the system skips the following frames and uses the available bit rate for retransmission until the residual packet error rate (RPER) is below a certain threshold (e.g., 15%). This retransmission scheme is based on the RPER of the current frame and can be combined with scheme 0, 1 and 2, respectively, as shown in FIG. 6. For instance, in case 1, before encoding frame i, it is determined that the wireless channel is in "medium" condition during the transmission of the previous frame and it is therefore decided to use retransmission scheme 1 for frame i. However, the actual channel condition during the transmission of frame i is much worse than expected and it is observed that after time slot i is used up, the RPER of frame i is still higher than 15%. Therefore, it is decided to use retransmission scheme 3, where frame i+1 is skipped and time slot i+1 is used for retransmitting still lost packets in frame i. After the retransmission in time slot i+1, the residual packet error rate of frame i is below 15% and no further frames will be skipped. Then, before encoding frame i+2, the proper retransmission scheme is selected for it depending on the PER of frame i.

3.5 Channel Adaptive Retransmission

Figure 7:
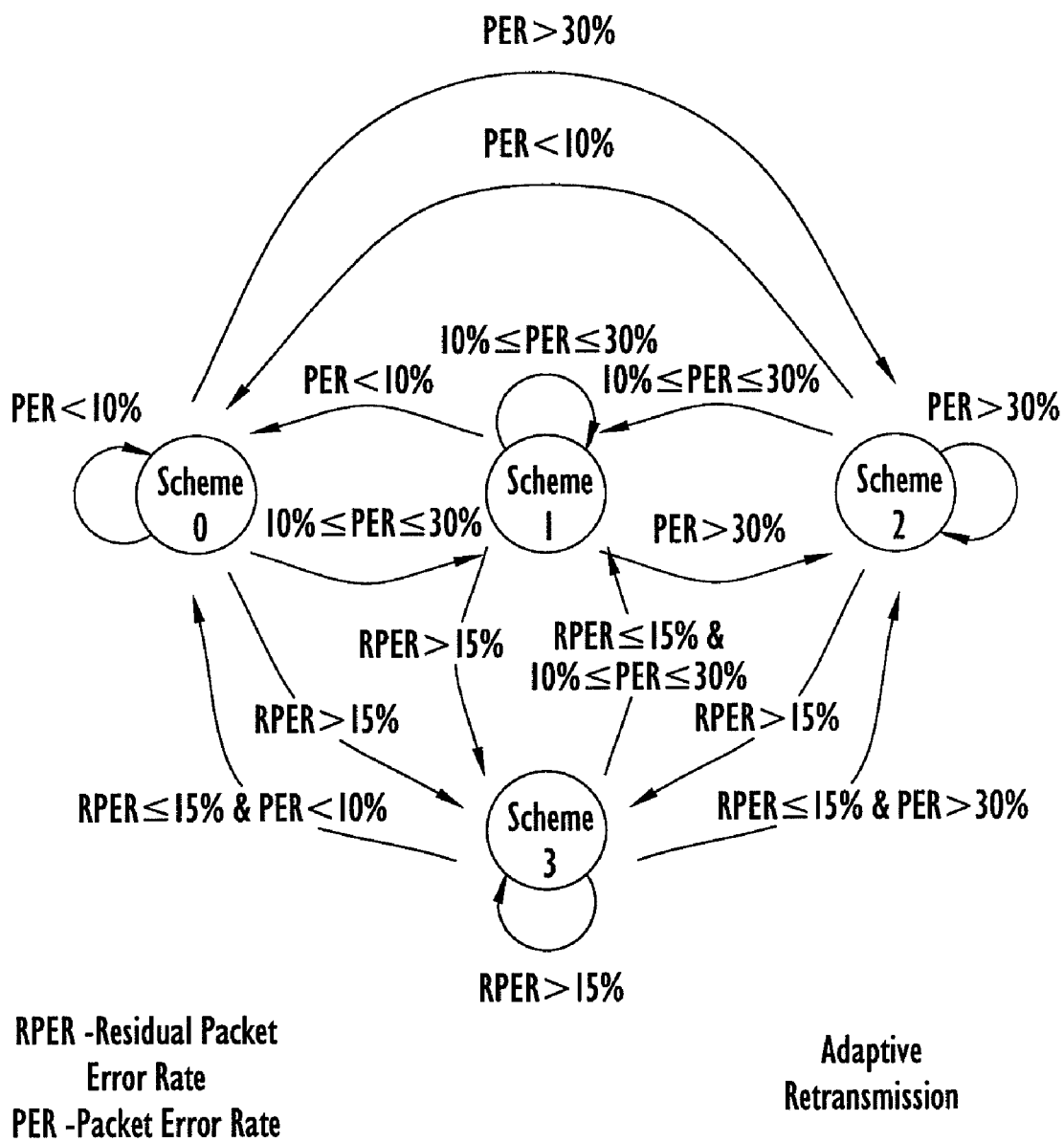
FIG. 7 depicts a state diagram of a channel adaptive retransmission scheme in accordance with embodiments of the present invention.

The state diagram depicted in FIG. 7 shows how the four retransmission schemes described above are combined, and form the channel adaptive retransmission scheme in accordance with embodiments of the present invention.

Before encoding a new video frame, scheme 0, 1 or 2 is selected for this frame according to the current channel condition (i.e., estimated using the packet error rate during the transmission of the previous frame). After the total available bit rate for transmitting the current frame is used up, the residual packet error rate is checked and it is determined if further retransmission of lost packets is necessary. If yes, the following frames are skipped and the available bit rate is used for the retransmission (scheme 3) until the RPER is below, for instance, 15%. If no further retransmission is necessary, the next frame will be encoded and transmitted according to the selected retransmission scheme for it. Using scheme 3 increases the likelihood that the residual packet error rate of a frame is below a certain value so that the displayed frame has a satisfactory quality. This improves the system performance significantly in case the wireless channel 108 goes suddenly into very bad condition, for instance, the receiver 110 goes out of the receiving range. In this case, the user will have a still image with satisfactory quality until the channel recovers (e.g., the receiver returns into the receiving range). Then a new video frame is encoded (probably in INTRA mode) and transmitted to the receiver. How to encode is determined by the mode decision algorithm of the encoder. If the most recently displayed frame has a significant time distance to the current frame, the mode decision algorithm will pick INTRA mode for most of the macroblocks. If only few frames were dropped, the INTER mode will typically be selected. With the channel adaptive retransmission scheme of the present invention, the user will almost always have satisfactory picture quality on the display, with the only drawback being that the frame rate is reduced occasionally.

Moreover, no increase in end-to-end delay is introduced by the instant retransmission scheme and therefore the video transmission system operates in real-time. For instance, if there is a move to coarser quantization to allow for retransmission of lost packets (scheme 1) only picture quality is decreased. If a frame is skipped in order to be able to perform many retransmissions (scheme 2, 3) only frame rate is decreased.

3.6 Channel Adaptive Retransmission-Quantization Control

As explained, the channel adaptive retransmission scheme is used in the system to handle video packets that are lost in the wireless channel 108 during transmission. All the packets of a video frame are transmitted only once in the first round of transmission. If the available transmission bit rate is higher than the encoding bit rate, retransmission of lost packets can occur in the first round. If not all the packets are received successfully after the second round and there is still bit rate available for retransmission, the packets that are still lost can be transmitted again in the third round. This retransmission process stops when the available transmission bit rate for this frame is used up or all the packets are successfully received by the receiver.

In order to save some bit rate for retransmission, the system can either use coarser quantization for encoding the current frame or skip the next frame. The decision between these two possibilities is made adaptively based on the channel status. Before encoding a new frame, the system obtains the packet error rate in the channel during the transmission of the previous frame based on the instantaneous feedback information from the receiver 110.

Those skilled in the art will appreciate that any other means by which an estimate of the current channel situation is made available to the sender may be implemented. Employing the observed loss rate for the previous time slot as the estimate of the loss rate for the current time slot, as described herein, is only one option. The more accurate the channel estimation for time slot i is, the better the performance of the system is.

In any event, the system is configured to expect that the current frame will also suffer a similar extent of loss and thus makes its decision based on that expectation. If the packet error rate is low, the system does not consider retransmission, as error concealment (discussed more fully below) will give satisfactory quality. If the packet error rate is medium, the system employs coarser quantization for encoding and performs retransmission. If the packet error rate is high, the system skips the next frame and the total bit budget is split into the bit budget for source encoding and the retransmission budget.

If the residual packet error rate of the current frame is still too high after the total bit budget is used up, the system skips the following frames and uses the available bit rate for retransmission until the residual packet error rate is below a certain threshold.

PER and RPER is determined by feedback received from the receiver 110/decoder 112. Preferably the feedback is "instantaneous" in that the positive or negative acknowledgments for packets/slices are received before these slices are referenced for motion compensated prediction during encoding of the current frame. In other words, the feedback for particular slices has to be received before the corresponding area in the previous frame is referenced for motion compensated prediction. This is because this area has to be concealed before it is referenced.

Any type of feedback arriving early enough to conceal those parts of the previous frame before they are used for motion compensated prediction of macroblocks in the current frame is considered to be "instantaneous feedback" in the context of the present invention. To realize such instantaneous feedback, every packet can be acknowledged individually or several feedback messages might be combined into one return packet. Finally, it is noted that instantaneous feedback for slices in a lower part of a previous frame might arrive after the encoding of the current frame has already started since they will only be referenced by macroblocks in the lower part of the current frame.

3.7 Synchronized Error Concealment at Encoder and Decoder

If there are still some video packets lost after the retransmission, lost slices (corresponding to the lost packets) are concealed at the decoder. In addition, and in accordance with principles of the present invention, the identical error concealment is also preferably performed at the encoder. FIG. 4 depicts how such error concealment may be implemented. Specifically, the concealed reference frame is used both at the encoder and at the decoder to avoid mismatch in the motion compensated prediction. It is important that both encoder and decoder perform exactly the same error concealment. Otherwise mismatch will accumulate over time.

Spatial Concealment

Figure 8:
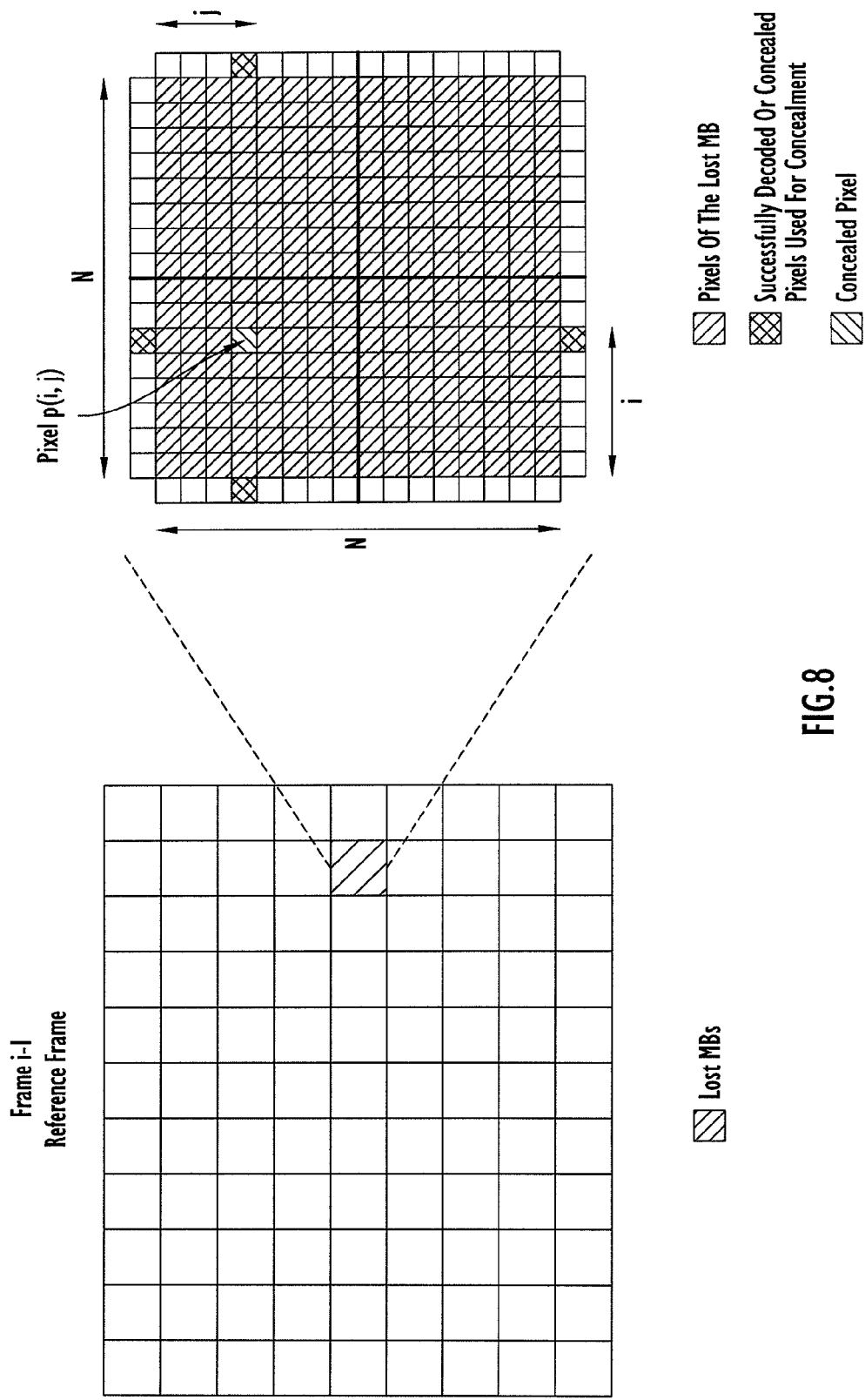
FIG. 8 depicts spatial interpolation of a lost macroblock in accordance with embodiments of the present invention.

One spatial concealment scheme, described in S. Aign and K. Fazel, "Temporal and Spatial Error Concealment Techniques for Hierarchical MPEG-2 Video Codec," in *IEEE International Conference on communication*, vol. 3, pp. 1778-1783, 1995, that may be used in connection with the present invention interpolates pixels in a lost macroblock from pixels in the neighboring correctly received or concealed macroblocks. With reference to FIG. 8, for a macroblock size of N×N the interpolation is performed as follows:

$$P(i, j) = \frac{1}{2}\left\{\left(1 - \frac{j}{N}\right)p(i, 0) + \frac{j}{N}p(i, N+1) + \left(1 - \frac{i}{N}\right)p(0, j) + \frac{i}{N}P(N+1, j)\right\}$$

In case some of the neighboring macroblocks are missing, the interpolation is calculated only from the available macroblocks.

Decoder Motion Vector Estimation (DMVE)

Figure 9:
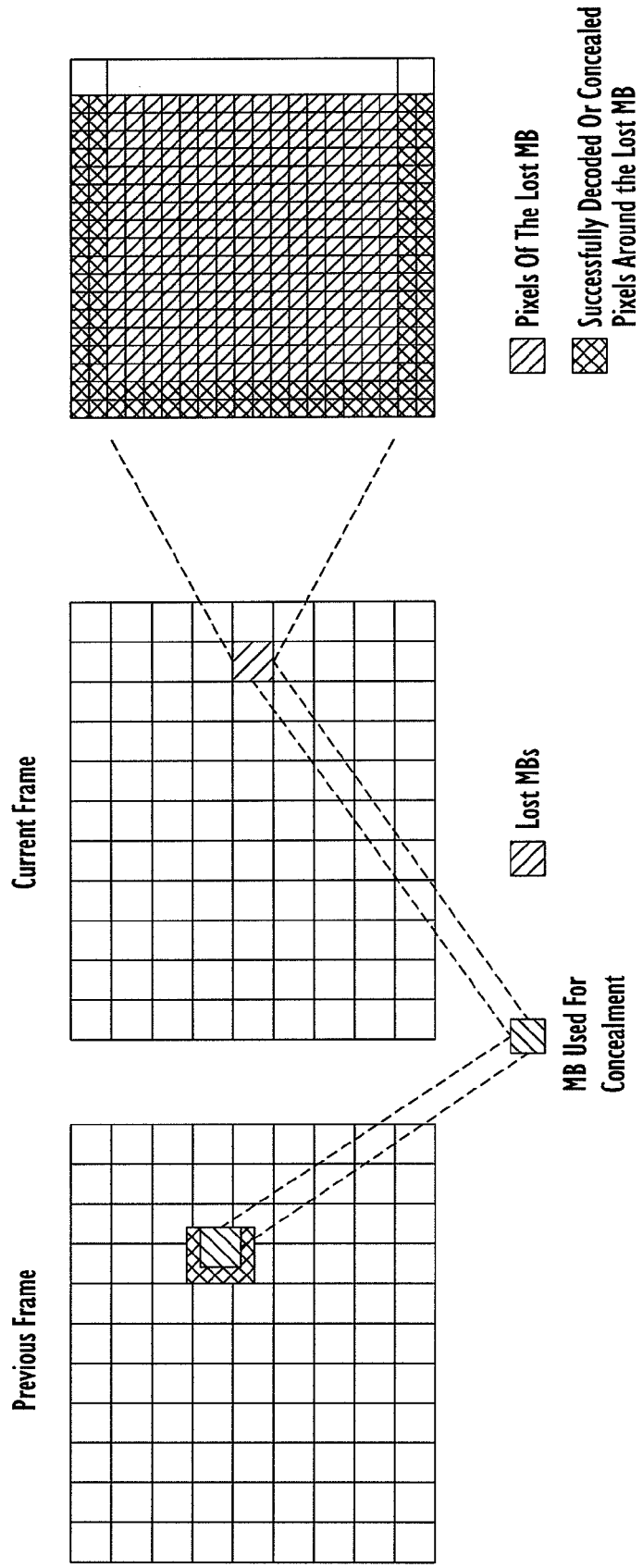
FIG. 9 illustrates decoder motion vector estimation (DMVE) for temporal error concealment in accordance with embodiments of the present invention.

Decoder motion vector estimation (DMVE), as disclosed in J. Zhang, J. F. Arnold, and M. R. Frater, "A Cell-loss Concealment Technique for MPEG-2 Coded Video," *IEEE Trans. Circuits Syst. Video Technol.*, vol. 10, no. 4, pp. 659-665, June 2000 is a temporal concealment scheme that may be used in connection with the present invention, where the lost macroblock is replaced by the macroblock of the previous frame at the motion compensated position, as depicted in FIG. 9. The corresponding position in the previous frame is determined by checking a small number of candidate motion vectors:

Motion vector for the same macroblock in the previous picture;

Motion vectors associated with available neighboring macroblocks;

Zero motion vector.

Out of the set of candidate motion vectors, the one that leads to the smallest error for an eight-pixel wide image area around the macroblock to be concealed is selected for concealment.

Combined Spatial and Temporal Concealment

Figure 10:
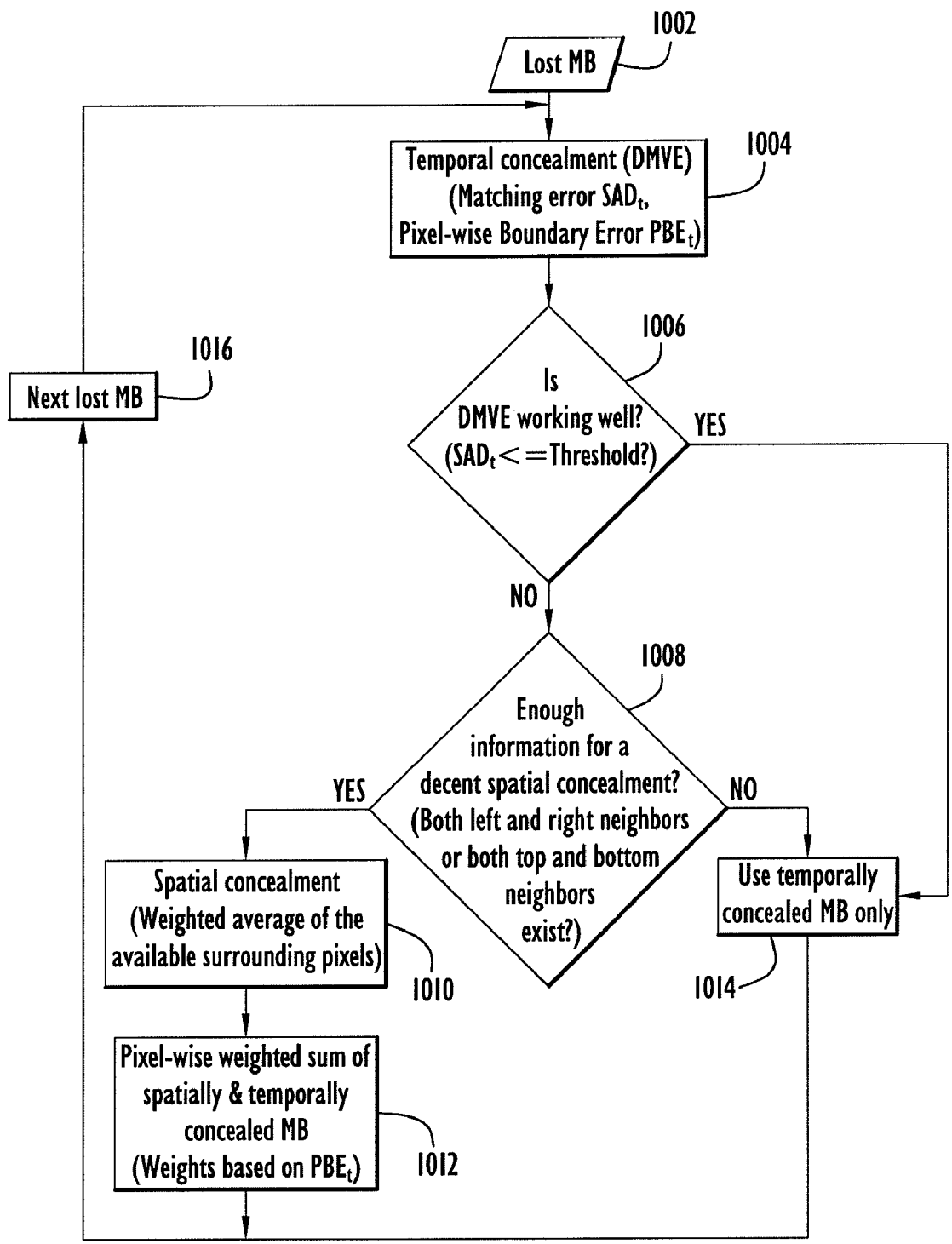
FIG. 10 shows an exemplary series of steps for performing combined spatial and temporal error concealment in accordance with embodiments of the present invention.

Combined spatial and temporal concealment is preferably used in implementations of the present invention, where DMVE (temporal concealment) is combined with spatial interpolation. A process for such a combination is shown in FIG. 10. The error measure in DMVE is used to evaluate the performance of DMVE and is used as the weighting factor in the combination. More specifically, beginning with a given lost MB at step 1002, temporal concealment using DMVE is performed at step 1004. Both matching error using SAD and pixel-wise boundary error (PBE) can be employed. If it is determined that DMVE is working well (e.g., if SAD is less than or equal to a predetermined threshold) at step 1006, then the process moves to step 1014 at which error concealment using temporal concealment is relied upon exclusively.

If, on the other hand, at step 1006 it was determined that DMVE was not working well, then the process moves to step 1008 at which it is determined if there is sufficient information for spatial concealment. This determination can be made based on whether, e.g., both left and right neighbors, or both top and bottom neighbors, exist for a given MB. If there is insufficient information, then spatial error concealment cannot be performed and the process continues with temporal concealment at step 1014.

If it is determined that there is sufficient information for spatial error concealment at step 1008, then at step 1010 spatial error concealment is performed using, e.g., a weighted average of the available surrounding pixels. Then, at step 1012, a pixel-wise weighted sum of a spatially and temporally concealed MB (with weights based on PBE) is employed for the missing or lost MB. The next lost MB is then considered for error concealment.

Those skilled in the art will appreciate that other error concealment methodologies may be employed in connection with embodiments of the present invention and that the DMVE temporal concealment and spatial concealment methodologies described above are to be considered exemplary and non-limiting.

Figure 11:
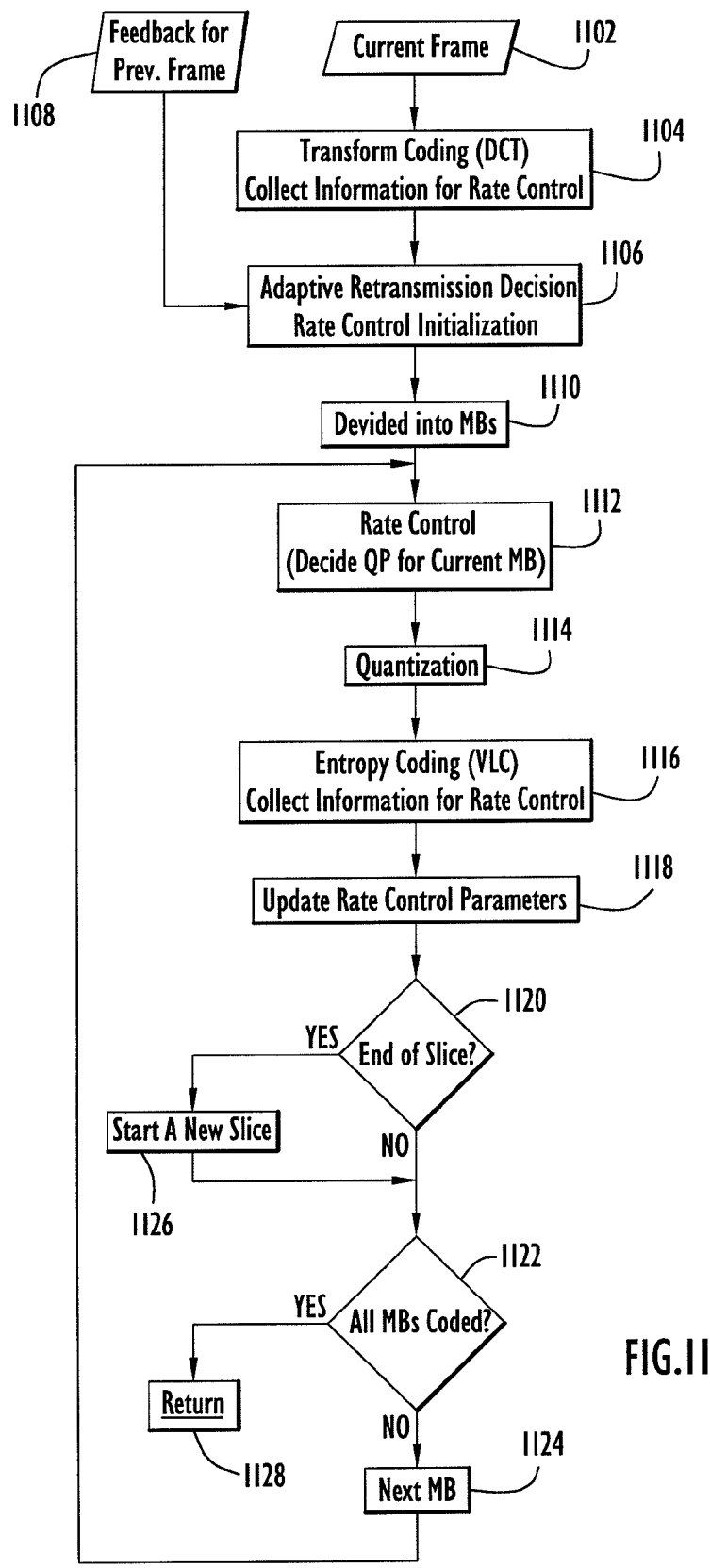
FIG. 11 shows an exemplary series of steps performed by an encoder when encoding an I-frame in accordance with embodiments of the present invention.

FIG. 11 shows an exemplary series of steps for encoding an I-frame in accordance with an embodiment of the present invention. As shown, at step 1102, data for the current frame is captured. At step 1104, DCT transform coding is performed and information for rate control is collected. For example, it is determined how many of the coding coefficients are non-zero. Then, using the PER from the previous frame from step 1108, an adaptive retransmission decision is made at step 1106 along with rate control initialization. This step establishes the conditions for encoding the current frame.

The frame is then divided into macroblocks (MBs) at step 1110 and rate control parameters are set at step 1112. At step 1114, quantization is performed and, at step 1116, variable length coding (VLC) is employed. Then, at step 1118, the rate control parameters are updated. Step 1120 determines whether the end of slice has just been encoded. If no, then step 1122 determines whether all MBs have been encoded. If all MBs have been encoded, then the process returns at step 1128. If not all of the MBs have been encoded, then the next MB is processed as indicated by step 1124. If at step 1120, the end of a slice has occurred, then at step 1126 a new slice is begun. In this way, as shown in FIG. 11, all of the MBs/slices of a given frame are INTRA coded and the rate parameters can be controlled in accordance with the adaptive retransmission methodology described above.

Figure 12A:
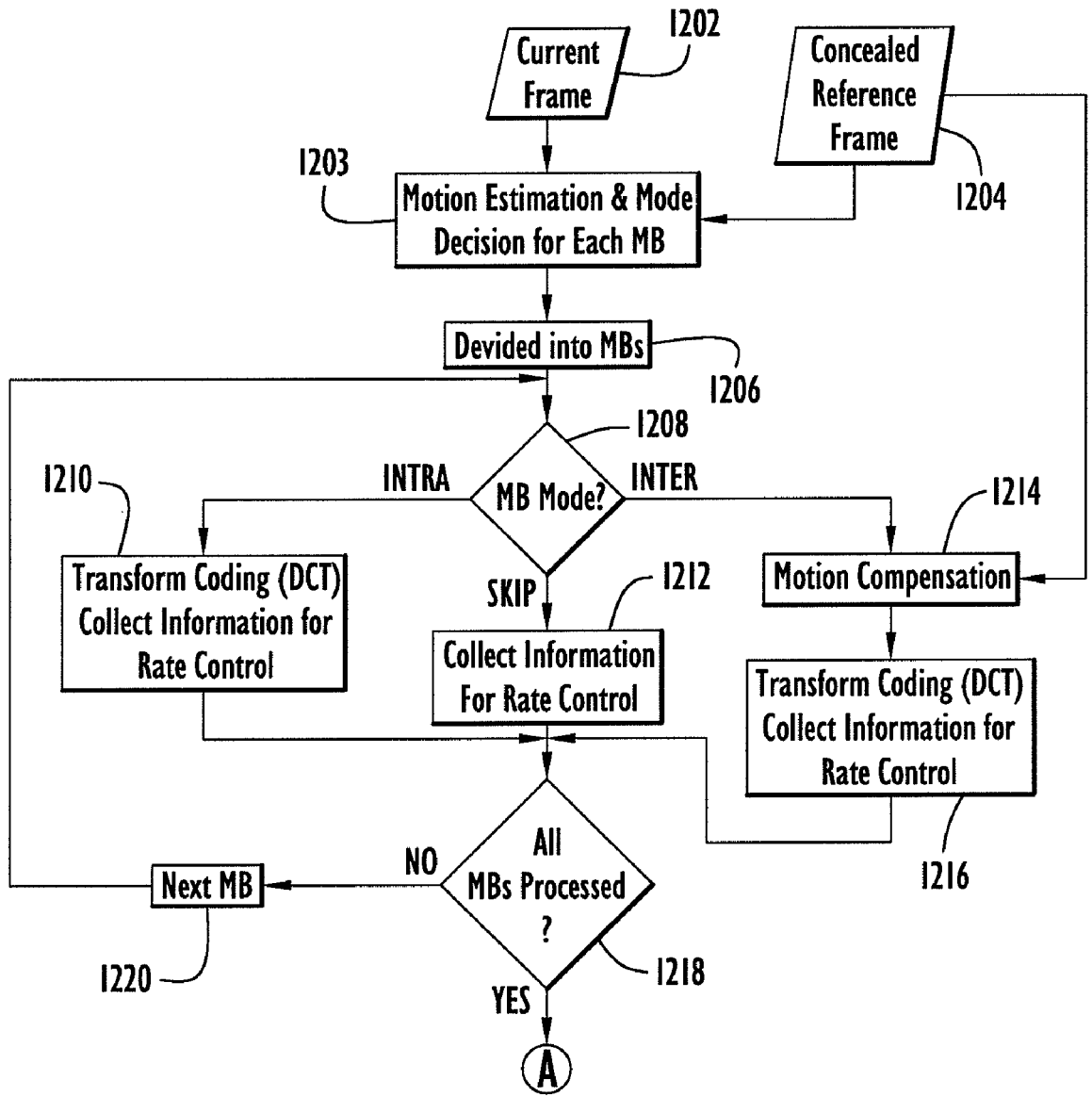
FIGS. 12A and 12B shows an exemplary series of steps performed by an encoder when encoding a P-frame in accordance with embodiments of the present invention.
Figure 12B:
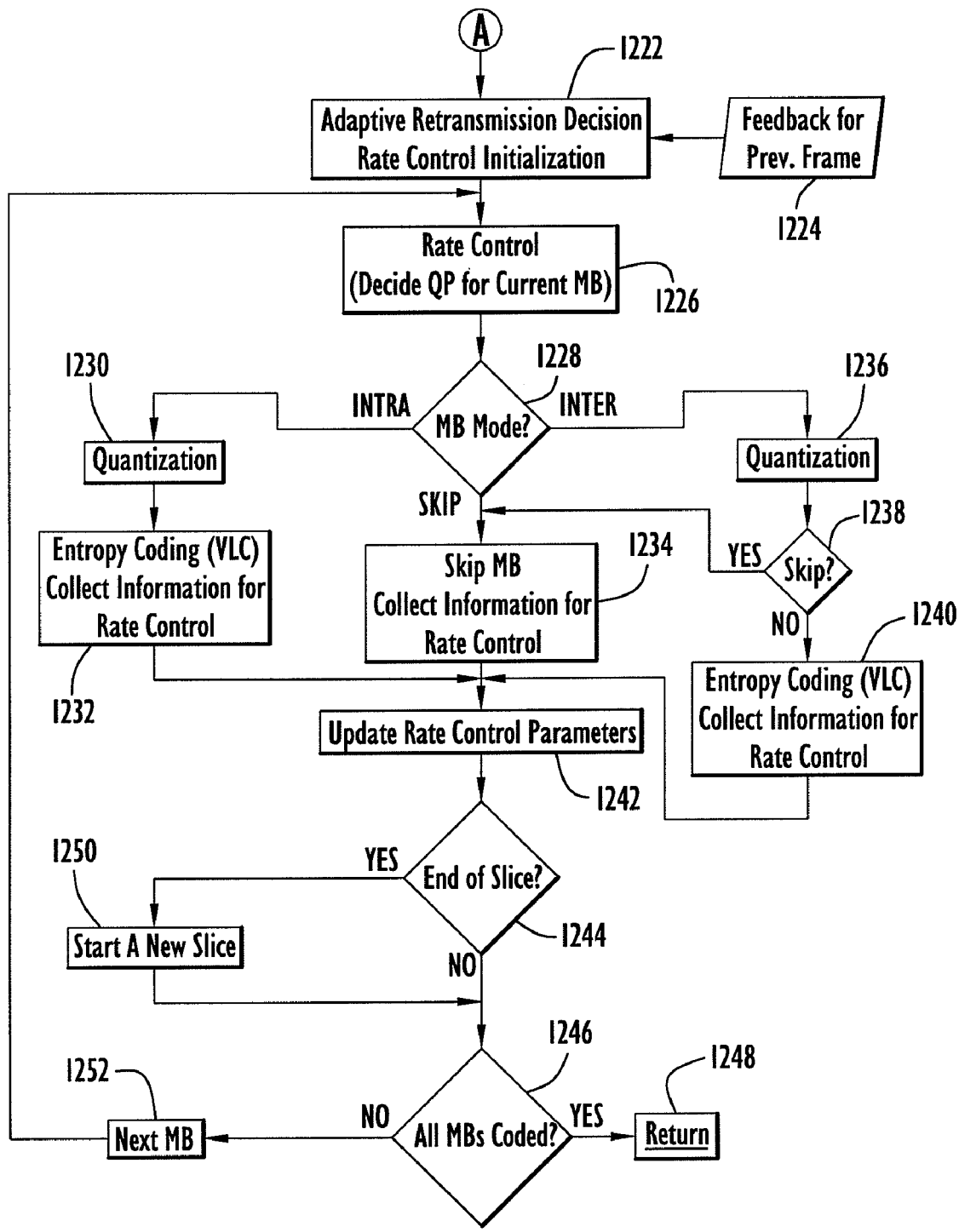

FIGS. 12A and 12B depict an exemplary series of steps for encoding a P-frame in accordance with embodiments of the present invention. In this case, the process begins at step 1202 where the image data for the current frame is obtained. At step 1204, data for a concealed reference frame is provided so as to perform motion estimation and make a mode decision (INTRA, INTER, SKIP) for each MB, at step 1203. The frame is then divided into a plurality of macroblocks at step 1206. Step 1208 determines which mode is to be selected for each MB and the appropriate processing is then applied to that MB. More specifically, if the MB is to be INTRA coded, then DCT transform coding is performed on the MB and rate control information is collected (step 1210). If the MB is to be skipped, then only rate control information is collected (step 1212). If the MB is to be INTER coded, then motion compensation is performed (step 1214) and DCT transform coding is performed on the MB and rate control information is collected (step 1216). Notably, for step 1214, the concealed reference frame (from step 1204) is also made available for motion compensation.

It is then determined whether all MBs have been processed at step 1218. If not, the next MB is selected as indicated at step 1220.

If all of the MBs have been processed, then at step 1222 an adaptive retransmission decision is made based on feedback from the previous frame (step 1224), and rate control is initialized. With the foregoing information, rate control is established at step 1226 and each MB is flagged for the appropriate processing (step 1228).

Specifically, if the MB is to be INTRA encoded, then at step 1230 quantization is performed and at step 1232 VLC entropy coding is performed and rate control information is collected. If the MB is to be skipped, then, at step 1234, rate control information is collected. If the MB is to be INTER encoded, then at step 1236 quantization is performed, at step 1238 it is determined whether the MB is to be skipped, and, if not, VLC entropy encoding is performed and rate control information is collected. If it is determined that the MB is to be skipped at step 1238, then no VLC entropy coding is performed, as shown.

Once the appropriate processing is completed for a given MB, the process continues with step 1242 where rate control parameters are updated. It is then determined, at step 1244, whether an end of a slice has been detected. If yes, then a new slice is started, as indicated by step 1250. If the end of a slice has not been detected, then it is determined at step 1246 whether all MBs have been encoded. If yes, the process is complete with respect to the instant frame. If all MBs have not been coded, then the next MB is selected at step 1252, and the process continues with step 1226 for that next MB.

EXPERIMENTAL RESULTS

Several experiments were performed in a real-time testbed to evaluate the performance of the system described herein. The experimental results are shown in Table 1. The Foreman sequence with CIF resolution (352×288) was used in the experiment and compressed at 1 Mbps, 25 fps. A time-varying channel with BER={1e-3, 1e-4, 1e-5} and the corresponding percentage P(BER)={0.2, 0.6, 0.2} was used, and the channel coherence time was 80 ms, corresponding to the duration of two frames.

TABLE 1

Decoded PSNR for various transmission techniques

| Transmission technique | PSNR (dB) | Displayed frames PSNR (dB) |
|---|---|---|
| Error free transmission | 35.0560 | 35.0906 |
| Adaptive retransmission | 32.2079 | 34.1178 |
| Concealment using feedback | 32.6247 | 32.6532 |
| Decoder concealment | 21.1902 | 21.1900 |

For the given time varying channel, using only decoder error concealment (no feedback) (shown by the last line in Table 1) results in a significant loss of about 14 dB in decoded video quality. Using synchronized error concealment at both encoder and decoder based on the instantaneous receiver feedback gives about 10.5 dB improvement compared to the case without feedback. In the case of adaptive retransmission, the average PSNR of all frames is a bit lower than without retransmission because the skipped frames are replaced by the corresponding previous frame, resulting in a significant decrease in PSNR for those skipped frames. However, if only the displayed frames are considered, the adaptive retransmission scheme gives a further 1.5 dB gain. This means that there will be better picture quality on the display, although the video frame rate will decrease occasionally. This gain may even be higher if the channel deteriorates. If only the quality of the displayed frames is considered, the reconstructed video quality is only 1 dB away from the error free case, where no packet is lost in the channel and all the bit budget is used for source coding.

In a different experiment, several comparisons were performed in a real-time testbed to evaluate the performance of the channel adaptive retransmission scheme in accordance with embodiments of the present invention. The experimental results are shown in Table 2 below. The Foreman sequence with CIF resolution (352×288) was used in the experiment and compressed at 1 Mbps, 25 fps. A time-varying channel with BER={1e-3, 1e-4, 1e-5} and the corresponding percentage P(BER)={0.2, 0.6, 0.2} was used, and the channel coherence time was 80 ms, corresponding to the duration of two frames. In this experiment, only the reconstructed quality of the displayed frames is shown in the results.

TABLE 2

Reconstructed quality of the displayed frames for various retransmission schemes

| Retransmission schemes | Displayed frames PSNR (dB) |
|---|---|
| No retransmission | 32.6247 |
| Retransmission scheme 0 + 1 + 2 | 33.4675 |
| Adaptive retransmission (0 + 1 + 2 + 3) | 34.1178 |
| Error free transmission | 35.0560 |

As shown in Table 2, for the given time varying channel, using only synchronized error concealment at encoder and decoder (no retransmission) results in about 2.4 dB loss in the average reconstructed picture quality compared to the error free case, where no packet is lost in the channel and the total bit budget for a frame is used for source coding. Using a combination of retransmission scheme 0, 1 and 2 based on the channel condition estimation using packet error rate of the previous frame gives about 0.8 dB improvement compared to the case without retransmission. The channel adaptive retransmission incorporating all the retransmission schemes gives a further 0.7 dB gain. The average reconstructed quality of the displayed frames is then only 1 dB away from the error free case. If the reconstructed quality of individual video frames is considered, especially the frames where the channel is in bad condition, there is an improvement of up to 10 dB using the channel adaptive retransmission scheme compared to the case without retransmission.

It will be apparent to those skilled in the art that various modifications and variations can be made in the systems and methods described herein consistent with the principles of the present invention without departing from the scope or spirit of the invention. Although several embodiments have been described above, other variations are possible consistent with the principles of the present invention.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. A method of providing error-resilient digital video, comprising:
    capturing a frame of video;
    encoding, with an encoder, the frame of video into a plurality of packets;
    transmitting the plurality of packets to a receiver over a channel;
    receiving, from the receiver, instantaneous feedback regarding successful receipt and decoding of respective ones of the plurality of packets, the instantaneous feedback thereby being indicative of one or more lost packets;
    calculating a packet error rate (PER) for the frame of video based on the instantaneous feedback;
    performing error-concealment at the encoder in a reference video frame that is used in the encoding step;
    based on the PER for the frame of video, adjusting a quantizing parameter for a subsequent frame of video and retransmitting one or more lost packets in a same time slot as the subsequent frame of video; and
    calculating a residual packet error rate (RPER) for a prior frame of video and, if the RPER is greater than a predetermined value, skipping a next video frame and any subsequent video frames, and using respective time slots for such skipped video frames for retransmission of lost packets of the prior frame of video until such time that the RPER falls below the predetermined value.

2. The method of claim 1, wherein transmitting comprises transmitting the plurality of packets over a wireless channel.

3. The method of claim 1, wherein the instantaneous feedback includes a negative acknowledgement.

4. The method of claim 1, further comprising performing synchronized error concealment using a receiver side decoder.

5. The method of claim 1, wherein the step of error concealment comprises spatial error concealment, temporal error concealment, or both.

6. The method of claim 1, further comprising splitting bit budget in a given time slot between encoding of the video frame and retransmission of lost packets.

7. The method of claim 1, further comprising skipping a next video frame and employing the bit budget thereof for encoding the fame of video and retransmission of lost packets when the PER is above a predetermined threshold.

8. The method of claim 1, wherein the encoder is a block-based hybrid video coder/decoder (codec).

9. The method of claim 8, further comprising dividing the frame of video into a plurality of macroblocks.

10. The method of claim 9, further comprising associating a plurality of macroblocks with a single slice.

11. The method of claim 10, further comprising encoding each slice into a respective packet.

12. The method of claim 9, further comprising selecting a coding mode for each macroblock, wherein the coding mode is one of INTRA coding, INTER coding, or SKIP mode, and encoding each macroblock according to the coding mode so selected.

13. A method for delivering real-time video imagery to a receiver over a channel, comprising:
  capturing a current video frame;
  encoding the current video frame by dividing the current video frame into a plurality of macroblocks and determining, for each macroblock, as a coding mode, whether to (1) skip the macroblock and copy the macroblock from a same location from a previous video frame, (2) intra code the macroblock without reference to a previous frame, or (3) inter code the macroblock using motion compensation based on a reference frame;
  determining a state of the channel over which the real-time video imagery is to be sent by monitoring feedback received from a receiver regarding video packets that have been successfully received, wherein the state of the channel is calculated based on a packet error rate for a frame of video prior to the current video frame;
  based on the state of the channel, controlling a quantization parameter for each macroblock to be quantized and encoding each macroblock in accordance with the coding mode; and
  packetizing the macroblocks so encoded and transmitting resulting video packets to the receiver; and
  calculating a residual packet error rate (RPER) and, if the RPER is greater than a predetermined value, skipping a next video frame and any subsequent video frames as long as the RPER remains greater than the predetermined value, and using respective time slots for such skipped video frames for retransmission of lost packets until such time that the RPER falls below the predetermined value.

14. The method of claim 13, wherein the channel is a wireless channel.

15. The method of claim 13, further comprising performing synchronized error concealment at the receiver.

16. The method of claim 13, wherein the error concealment comprises spatial error concealment, temporal error concealment, or both.

17. The method of claim 13, further comprising splitting bit budget in a given time slot between encoding of the current video frame and retransmission of video packets that were identified, from the feedback, as being lost.

18. The method of claim 13, further comprising skipping a next video frame and employing bit budget thereof for encoding the current frame of video and retransmission video packets that were identified, from the feedback, as being lost.

19. A system for transmitting real-time digital video, comprising:
  an encoder/transmitter configured to encode a current video frame by dividing the current video frame into a plurality of macroblocks and determining, for each macroblock, as a coding mode, whether to (1) skip the macroblock and copy the macroblock from a same location from a previous video frame, (2) intra code the macroblock without reference to a previous frame, or (3) inter code the macroblock using motion compensation based on a reference frame; and
  a receiver/decoder configured to send to the encoder/transmitter feedback regarding video packets that have been successfully received over a wireless channel by the receiver/decoder,
  wherein based on a state of the wireless channel, the encoder/transmitter is configured to control a quantization parameter for each macroblock to be quantized and is configured to encode each macroblock in accordance with the coding mode, and is further configured to packetize the macroblocks so encoded and transmit resulting video packets to the receiver/decoder,
  wherein the state of the channel is calculated based on a packet error rate for a frame of video prior to the current video frame; and
  wherein the encoder/transmitter is configured to calculate a residual packet error rate (RPER) and, if the RPER is greater than a predetermined value, to skip a next video frame and any subsequent video frames as long as the RPER remains greater than the predetermined value, and to use respective time slots for such skipped video frames for retransmission of lost packets until such time that the RPER falls below the predetermined value.

20. The system of claim 19, wherein the encoder/transmitter and receiver/decoder are configured to perform synchronized error concealment.

21. The system of claim 20, wherein the error concealment comprises spatial error concealment, temporal error concealment, or both.

22. The system of claim 19, wherein the encoder/transmitter is configured to split bit budget in a given time slot between encoding of the current video frame and retransmission of video packets that were identified, from the feedback, as being lost.

23. The system of claim 19, wherein the encoder/transmitter is configured to skip a next video frame and to employ bit budget thereof for encoding the current frame of video and retransmission video packets that were identified, from the feedback, as being lost.

24. The method of claim 1, further comprising selecting one of a plurality of transmission/retransmission schemes, based on the PER, wherein the transmission/retransmission schemes are configured to operate over time periods defined by a time period sufficient to transmit the entire frame of video.

25. The method of claim 24, wherein the plurality of transmission/retransmission schemes comprises (a) employing a total available bit rate for encoding the frame of video during a first time slot, (b) reducing quantization of encoding the frame of video and employing resulting available bit rate for retransmission of the one or more lost packets during the first time slot, and (c) skipping a next frame of video, doubling the bit rate used in (b) and reserving the remainder of bit budget for retransmission of the one or more lost packets during the first time slot and a second immediately subsequent time slot.

26. The method of claim 1, wherein a bit budget for the step of encoding is calculated as:

$$R_S^i = \frac{R_C^i}{1 + PER_{i-1} + (PER_{i-1})^2 + \ldots + (PER_{i-1})^n},$$

where $R_s^i$ denotes the bit budget for encoding frame i, $R_c^i$ denotes a total available bit rate for transmitting frame i, $PER_{,i-1}$ denotes the packet error rate in the channel during the transmission of frame i−1 and n is an expected integer number of retransmission rounds for frame i so that a residual packet error rate does not exceed a predetermined threshold.

27. The method of claim 26, wherein the predetermined threshold is determined by solving:

$(PER_{,i-1})^n$=predetermined threshold.

* * * * *